United States Patent [19]

Blake

[11] Patent Number: 5,608,524
[45] Date of Patent: Mar. 4, 1997

[54] COHERENCE COLLAPSED MULTIMODE SOURCE FOR A FIBER OPTIC GYRO

[75] Inventor: James N. Blake, College Station, Tex.

[73] Assignee: Honeywell Inc., Minneapolis, Minn.

[21] Appl. No.: 305,533

[22] Filed: Sep. 14, 1994

[51] Int. Cl.$^6$ .................................................. G01C 19/64
[52] U.S. Cl. .................................................. 356/350
[58] Field of Search ........................................ 356/350

[56] References Cited

U.S. PATENT DOCUMENTS

| | | | |
|---|---|---|---|
| 4,705,399 | 11/1987 | Graindorge et al. | 356/350 |
| 5,245,407 | 9/1993 | Nishiura et al. | 356/350 |
| 5,347,354 | 9/1994 | Muller et al. | 356/350 |

OTHER PUBLICATIONS

Paper "Integrated Optics: A Practical Solution for the Fiber–Optic Gyroscope" by H. C. Lefevre, S. Vatoux, M. Papuchon and C. Puech presented to the 10th Anniversary Conference 1986 of SPIE and printed in SPIE vol. 719 Fiber Optic Gyros on pp. 101–112.

Article "Scale–Factor–Stabilized Fiber–Optic Gyroscope Based on a Spectrum–Broadened Laser–Dide Source" by Pie–Yau Chien and Ci–Ling Pan and printed in vol. 16, No. 6/Mar. 15, 1991 issue of Optics Letters.

*Primary Examiner*—Vincent P. McGraw
*Attorney, Agent, or Firm*—Charles J. Ungemach

[57] ABSTRACT

A fiber optic gyro utilizing a multimode mode high power laser diode source with the partly reflective mirror to reflect back some light to the source to cause coherence collapse and broaden the line width and employing a long depolarizer connected to the fiber optic coil to reduce the effects of mode partition noise in the light.

15 Claims, 1 Drawing Sheet

COHERENCE COLLAPSED MULTIMODE SOURCE FOR A FIBER OPTIC GYRO

BACKGROUND OF THE INVENTION

1. Field of the Invention

The present invention relates to fiber optic gyroscopes and more particularly, to a fiber optic gyroscope which employs a high power laser diode as a source.

2. Description of the Prior Art

A number of fiber optic gyroscopes are well known in the prior art. Examples may be found in copending application Ser. No. 08/254,804 filed Jun. 6, 1994 in the name of Avery A. Morgan and assigned to the assignee of the present invention, in U.S. Pat. No. 4,705,399 issued Nov. 10, 1987 and in a paper entitled "INTEGRATED OPTICS: A PRACTICAL SOLUTION FOR THE FIBER-OPTIC GYROSCOPE" BY H. C. Lefevre, S. Vatoux, M. Papuchon and C. Puech presented to the 10th Anniversary Conference 1986 of SPIE and printed in SPIE Vol. 719 Fiber Optic Gyros on pages 101–112. In such systems a fiber optic coil receives light at both ends simultaneously to cause counter propagating beams therein. Under conditions where there is no rotation about an axis normal to the plane of the coil, the beams take the same amount of time to traverse the coil length in both directions and they emerge from the ends in phase. However, if the loop experiences a turning motion about the axis, one beam travels slightly further than the other to complete the loop and emerges displaced in phase. The light from the two ends is passed through a beam splitter to a light detector and because the two beams are displaced in phase, they produce an interference pattern and the intensity measured by the detector is then indicative of the amount of interference and thus indicative of the rate of rotation that the fiber optic loop experiences. Rather than read the output of the detector directly, a closed loop re balance system may be utilized wherein a re balance voltage which increases in a ramp fashion is presented to a modulator located at one end of the fiber optic coil. The modulator operates to introduce an equal but opposite effect on the counter rotating beams so that, at balance, the beams are again in phase and the output of the detector is nulled, or peaked. More particularly, as the ramp voltage increases, the path length is changed a first amount for the beam just entering the fiber at the modulator end but the beam exiting on the other end had been subjected to a different path length change due to the voltage from the modulator which existed when it entered the modulator end. By changing the slope of the ramp the difference between the voltages applied to the entrance and exit beams can be made greater or smaller with the result that the phase shift induced by the modulator effect can be made equal to the phase shift resulting from the rotation.

Prior art fiber optic gyros have utilized relatively low power laser diode sources because high power sources were not economically feasible. Broad band outputs are desirable for gyro use and high power ones (those above 1 milliwatt) have narrow bandwidths. It is, however, desirable in some cases to use high power sources, for example, in order to lower the random noise performance and in cases where one source is needed to power multiple gyros. In the past, Edge Light Emitting Diodes (ELEDs) and Super Luminescent Diodes (SLDs) and certain high power Fiber Light Sources have been considered but at the present time, the ELEDs and the SLDs have not had significantly higher "pigtailed" power (that power available to the gyro) and are rather expensive and the Fiber Light Sources, although having sufficient power, are almost prohibitively expensive. In an article entitled "SCALE-FACTOR STABILIZED FIBER OPTIC GYROSCOPE BASED ON A SPECTRUM BROADENED LASER DIODE SOURCE" by Pie-Yau Chien and Chi-Ling Pan and printed in Vol. 16, No. 6 /Mar. 15, 1991 issue of OPTICS LETTERS, the use of a single mode laser with a broadened spectrum for use in a fiber optic gyro is discussed but such a source would not have multimodes and the light reflection is from the entrance end of the fiber and is thus too close to the source. Another problem encountered in the prior art is mode partition noise which exists in multimode laser diodes. This is a result of the fact that in a multimode source, the diodes have several wavelengths and the output to the gyro jumps between the various wavelengths or modes or parts of various modes. The wavelengths changes is mode partition noise. When a depolarizer is used in the fiber gyro circuit, the mode partition noise is converted to intensity noise which is a more serious problem. With a depolarizer, the amount of light reaching the detector depends on the wavelength from the source and, as the wavelength changes, so does the magnitude of the light reaching the detector. This effect will be further described below.

BRIEF DESCRIPTION OF THE PRESENT INVENTION

It is known that if part of the light from a single mode laser diode is reflected back into the source, and the reflection occurs at least a number of coherence lengths from the source, the line width of the source is dramatically broadened. The feedback light is incoherent with the light being generated within the source and this acts as a cavity noise source that broadens the line width of the newly generated lasing mode. This phenomena has been referred to as "coherence collapse" and the broadening of the line width was thought to be generally undesirable. Coherence collapse also occurs in multimode laser diodes and thus has applicability to laser gyros where broad line widths are needed.

The mode partition noise problem is solved by making the depolarizer long enough that the envelop of the coherence function peaks has died down which operates to suppress the mode partition noise in a depolarized gyro. The collapsing feedback is applied to the light source acts to decouple the various lasing modes and increasing the feedback level acts to further reduce the mode partition noise. Collapsing feedback also shortens the length of the long depolarizing section needed in the gyro by broadening the individual mode line widths. The power feedback to the source must exceed a certain threshold or the source is unstable but if it is too much, not enough light will get through. I have obtained good results with reflections of about 18 percent.

DETAILED DESCRIPTION OF THE PREFERRED EMBODIMENTS

Figure 1:
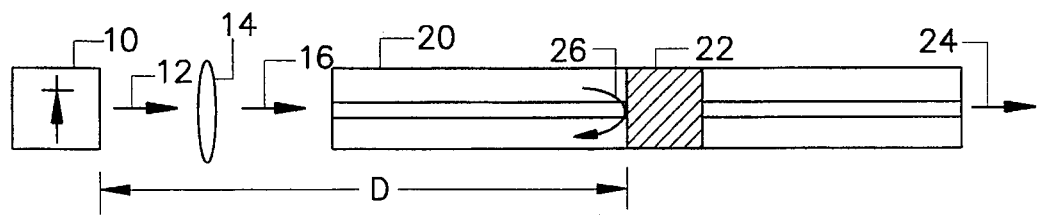
FIG. 1 shows a laser diode source and a partly reflective mirror for collapsing feedback.

In FIG. 1, a high power multimode laser diode 10 is shown emitting a beam of light along a path shown by arrow 12. The light from diode 10 is focused by a lens 14 and travels over a path shown by arrow 16 to one end of a PM fiber 20. The light travels along PM fiber 20 to a partly reflective mirror 22 which may be placed therein by depositing a thin layer of $TiO_2$ on one end of a PM fiber of the desired length and then splicing a second PM fiber thereto. The mirror reflects a percentage of the light and passes the remainder there through so the light emerges from PM fiber 20 along a path shown by arrow 24. The light which is reflected by mirror 22, as shown by curved arrow 26, passes back through PM fiber 20 and lens 14 to diode 10. The percentage of light reflected by mirror 22 may be any suitable value but should be greater than about 2% or the source 10 may become unstable and with increasing percentages, reflected, the bandwidth of the source increases. I have found that, with a 2 milliwatt index guided simple cavity multimode mode 1.3 micron laser diode, a reflection of about 18% is satisfactory. A high power diode has a power in excess of 1 milliwatt and since there is about a 50% loss in coupling the power to the fiber pigtail, diode 10 should have in excess of 2 milliwatts of power so that there is at least 1 milliwatt of pigtailed power.

As mentioned above, the reflecting of light back to the diode produces collapsing feedback and this broadens the bandwidth. I have found that this effect also works on multimode diodes as are needed in fiber optic gyros. The distance D between the diode 10 and the mirror 22 should be at least several time the coherence length of source 10. In one embodiment, the distance D was about one meter and the source 10 had a 1.3 micron wavelength but other wavelengths may be employed.

Figure 2:
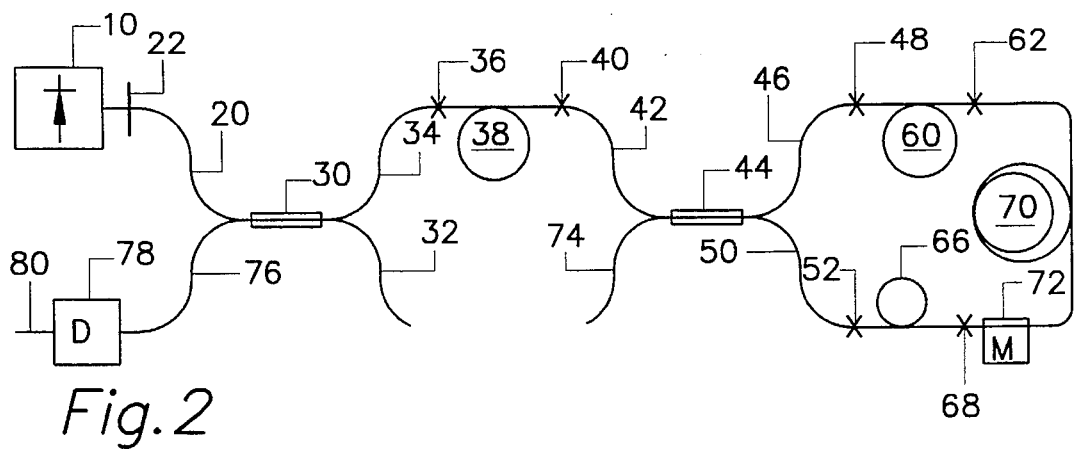
FIG. 2 is a schematic representation of one embodiment of the present invention.

FIG. 2 shows a fiber optic gyro consisting only of fibers (i.e. without an I/O chip). In FIG. 2, diode 10 produces its output along PM fiber 20 containing mirror 22 as was the case in FIG. 1. The lens 14 has been omitted for simplicity. The PM fiber 20 is shown connected to a first PM coupler 30 which operates to divide the light into two parts, one of which passes to a PM fiber 32 and is not used while the other passes to a PM fiber 34 where it travels to a 0 degree splicing 36 and through a polarizer 38 to a 0 degree splicing 40. The purpose of polarizer 38 is to linearly polarize the light for use by the fiber optic gyro. The output of the first polarizer 38 is presented via a PM fiber 42 to a second PM coupler 44 where the light is split into two portions, a first traveling over a PM fiber 46 to a 45 degree splicing 48 and the second over a PM fiber 50 to a 45 degree splicing 52. In order to suppress mode partition noise, a first, or long depolarizer 60 is connected between 45 degree splicing 48 and a splicing 62. A second, or short depolarizer 66 is connected between 45 degree splicing 52 and splicing 68. The 45 degree splicings 48 and 52 are to split the light equally between the fast axis and the slow axis of the depolarizers 60 and 66. The coil 70 of the fiber optic gyro is connected between splicing 62 and a modulator 72 the other side of which is connected to the splicing 68. As explained above, the coil 70 receives the light at both ends and these beams travel in opposite directions around the coil 70. Any rotation of the coil causes the two beams to become displaced in phase. The light leaving the coil 70 travels back through the depolarizers 60 and 66, to PM coupler 44 where the light is again split into two portions, one of which passes to PM fiber 74 and is not used while the other passes through polarizer 38 to the PM coupler 30 where the light is again split with a first portion passing back through PM fiber 20 to the source 10 while the other is passed via a PM fiber 76 to a detector 78 which produces an output indicative of the amount of light received on an output 80. As mentioned, the signal on output 80 changes with rotation rate and through a circuit, not shown, operates to effect the modulator 72 to counter balance the effect of the rotation.

As previously mentioned, the output of the laser diode 10 changes from one mode to another (mode partition noise) and in a depolarized gyro produces intensity noise. The important aspects of the noise can be better understood by considering a source having two equal modes with energy randomly exchanging between them. Such a source exhibits a decaying cosinasoidal coherence function, the decay rate of which is determined by the spectral width of the individual modes. The depolarizers 60 and 66 work between the peaks when the length of the depolarizer is such that the polarization states of the two frequency components of the source are orthogonal at the output of the depolarizer. Since there is equal energy in the two frequencies, the light appears unpolarized. However, on a time scale of micro seconds, the light is not depolarized. At any instant of time, one laser mode may be stronger than the other, leaving the output partially polarized. The polarized part of the output light passes throughout the analyzer with an efficiency that depends on its polarization state. Thus the instantaneous light intensity received at the detector fluctuates as the energy of the source changes between the modes. The noise is reduced by increasing the length of the depolarizer. A very long depolarizer will eventually depolarize each individual lasing mode and the noise is also suppressed, since one half the energy of each mode passes the analyzer, making the total intensity received at the detector independent of which mode was lasing at the time. This same reasoning applies to multimode source. Accordingly, the long depolarizer 60 is made long enough to guarantee that energy from every lasing mode is detected at the gyro output so that no additional noise arises as the energy exchanges between various modes of the source. In one embodiment, the long depolarizer was about 15 meters in length.

Short depolarizer 66 need only be several inches in length and is there to correct for problems due to magnetic field sensitivity and thermal mechanical effects.

Figure 3:
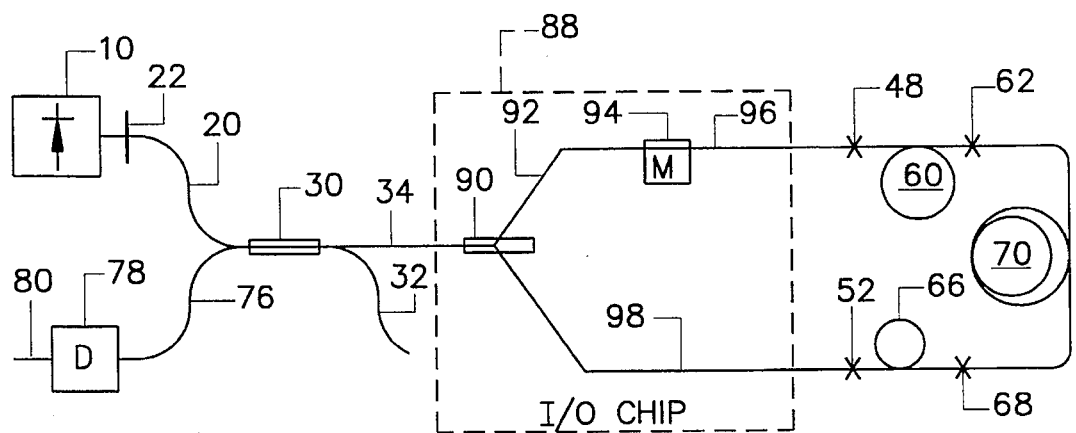
FIG. 3 is a schematic representation of a second embodiment of the present invention.

FIG. 3 is the same as FIG. 2 except that the polarizer 38, the PM coupler 44 and the modulator 72 are now part of an input/output chip shown by dashed line 88. In FIG. 3, a "Y" coupler 90 divides the light from PM fiber 34 into two paths, one of which passes via a path 92 to a modulator 94 and to the long depolarizer 60 via a path 96 while the other passes out via a path 98 to the short depolarizer 66. The operation of FIG. 3 is the same as FIG. 2 but FIG. 3 has the advantage of a more compact and less expensive structure.

It is therefore seen that I have provided a fiber optic gyro which can be operated from a multimode high power laser diode and which suppresses the mode partition noise that accompanies such use by a long depolarizer. Many modifications and changes will occur to those having skill in the art and I do not wish to be limited to the disclosures used in connection with the description of the preferred embodiments.

The embodiments of the invention in which an exclusive property or right is claimed are identified as follows:

1. A fiber optic gyro utilizing a high power laser source having a pigtail and producing light along a light path to a fiber optic coil, the improvement comprising:

a partially reflecting mirror positioned at the remote end of the laser source pigtail in the light path at least several times the coherence length of the source away from the source and operable to reflect a predetermined percentage of the light back to the source, so as to cause collapsing feedback to broaden the line width.

2. Apparatus according to claim 1 wherein the predetermined percentage is greater than 2 percent.

3. Apparatus according to claim 2 wherein the predetermined percentage is about 18 percent.

4. Apparatus according to claim 1 further including a long depolarizer in the light path to suppress effects of mode partition noise.

5. Apparatus according to claim 4 wherein the source is a multimode source and the length of the long depolarizer is sufficient to depolarize each of the modes of the source.

6. Apparatus according to claim 1 further including a detector positioned to receive the light from the fiber optic coil and produce an output in accordance therewith.

7. Apparatus according to claim 6 further including a modulator responsive to the detector output.

8. Apparatus according to claim 1 wherein the source is a multimode laser diode.

9. Apparatus according to claim 1 wherein the mirror is in a polarization maintaining fiber.

10. Apparatus for reducing the effects of mode partition noise in a fiber optic gyro having a multimode laser diode light source, a fiber optic coil and a detector to receive light from the source through the coil comprising:

a depolarizer in the path from the light source and the coil, said depolarizer having a length long enough to assure that energy from every lasing mode is detected by the detector.

11. Apparatus according to claim 10 wherein the depolarizer is about 15 meters in length.

12. A fiber optic gyro comprising:

a high power multimode laser diode light source having a pigtail;

partly reflective means positioned at the remote end of the light source pigtail at least several times the coherent length of the source away from the source reflecting a portion of the light back to the source to cause coherence collapse;

a first coupler having a first input connected to receive the light from the source and produce first and second outputs;

a detector connected to the first output of the first coupler and operable to produce a signal indicative of the magnitude of the light received by the detector;

a polarizer connected to the second output of the first coupler to polarize the light therefrom and provide a polarized light output;

a second coupler connected to receive the polarized output and to produce first and second polarized outputs;

a long depolarizer connected to receive the first polarized output to reduce the mode partition noise therein and produce a reduced noise output;

a short depolarizer connected to receive the second polarized output to correct for magnetic field sensitivity and thermo mechanical effects and produce a corrected output;

a fiber optic coil having a first and second ends to receive and conduct light in counter-propagating paths; and mean connecting the first end of the coil to the long depolarizer and the second end of the coil to the short depolarizer.

13. Apparatus according to claim 12 further including a modulator connected between the second coupler and the fiber optic coil, the modulator responsive to the detector output to produce a re balance signal.

14. Apparatus according to claim 12 wherein the polarizer, and the second coupler are part of an input/output chip.

15. Apparatus according to claim 13 wherein the polarizer, the second coupler and the modulator are part of an input/output chip.

* * * * *